United States Patent
Tsukagoshi

(10) Patent No.: US 10,979,748 B2
(45) Date of Patent: Apr. 13, 2021

(54) TRANSMISSION DEVICE TO TRANSMIT A TRANSMISSION STREAM IN WHICH A TRANSMISSION PACKET IS CONTIGUOUSLY ARRANGED

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/308,243

(22) PCT Filed: May 8, 2015

(86) PCT No.: PCT/JP2015/063391
§ 371 (c)(1),
(2) Date: Nov. 1, 2016

(87) PCT Pub. No.: WO2015/174354
PCT Pub. Date: Nov. 19, 2015

(65) Prior Publication Data
US 2017/0064343 A1    Mar. 2, 2017

(30) Foreign Application Priority Data

May 12, 2014    (JP) .............................. JP2014-098730

(51) Int. Cl.
*H04N 21/2381* (2011.01)
*H04N 21/434* (2011.01)
(Continued)

(52) U.S. Cl.
CPC ......... *H04N 21/2381* (2013.01); *H04L 69/22* (2013.01); *H04L 69/324* (2013.01);
(Continued)

(58) Field of Classification Search
CPC ...... H04N 21/21; H04N 21/236; H04N 21/41; H04N 21/434; H04N 21/2381;
(Continued)

(56) References Cited

U.S. PATENT DOCUMENTS

| | | | |
|---|---|---|---|
| 7,082,477 B1 * | 7/2006 | Sadhasivam | H04L 63/0428 370/392 |
| 7,096,488 B1 * | 8/2006 | Zhang | H04N 21/23424 375/240.01 |

(Continued)

FOREIGN PATENT DOCUMENTS

| | | | |
|---|---|---|---|
| JP | 2006-050077 A | 2/2006 | |
| JP | 2012-015875 A | 1/2012 | |

(Continued)

OTHER PUBLICATIONS

Shuichi Aoki, "Media Transport Technologies for Next Generation Broadcasting Systems", Broadcast Technology No. 53, Summer 2013, pp. 22-31.

(Continued)

*Primary Examiner* — Jeremy S Duffield
(74) *Attorney, Agent, or Firm* — Oblon, McClelland, Maier & Neustadt, L.L.P.

(57) ABSTRACT

Provided is that detection of a start byte of an access unit of media data can be performed fast and easily from a layer of a transmission packet. A transmission stream is transmitted in which a transmission packet is contiguously arranged having a multiplexed transport packet including the media data in an upper layer. Identification information is inserted for identifying whether or not a start byte of an access unit of the media data exists in the transmission packet, into the header of the transmission packet.

11 Claims, 17 Drawing Sheets

(51) Int. Cl.
*H04N 21/21* (2011.01)
*H04N 21/236* (2011.01)
*H04N 21/41* (2011.01)
*H04L 29/06* (2006.01)
*H04L 29/08* (2006.01)
*H04N 21/643* (2011.01)

(52) U.S. Cl.
CPC ........... *H04N 21/21* (2013.01); *H04N 21/236* (2013.01); *H04N 21/41* (2013.01); *H04N 21/434* (2013.01); *H04N 21/4343* (2013.01); *H04N 21/64322* (2013.01)

(58) Field of Classification Search
CPC .......... H04N 21/4343; H04N 21/64322; H04L 69/22; H04L 69/324
See application file for complete search history.

(56) References Cited

U.S. PATENT DOCUMENTS

| | | | | |
|---|---|---|---|---|
| 9,491,261 | B1* | 11/2016 | Shagam | H04L 67/40 |
| 2002/0116705 | A1* | 8/2002 | Perlman | H04N 21/2347 |
| | | | | 725/31 |
| 2007/0110236 | A1* | 5/2007 | Tada | H04N 21/4334 |
| | | | | 380/201 |
| 2007/0183756 | A1* | 8/2007 | Vaughan | H04N 21/23113 |
| | | | | 386/211 |
| 2009/0079878 | A1* | 3/2009 | Lee | H04N 21/235 |
| | | | | 348/724 |
| 2013/0039278 | A1* | 2/2013 | Bouazizi | H04L 65/4076 |
| | | | | 370/328 |
| 2014/0064280 | A1* | 3/2014 | Qin | H04B 7/18582 |
| | | | | 370/392 |
| 2015/0049773 | A1* | 2/2015 | Yang | H04L 69/22 |
| | | | | 370/474 |

FOREIGN PATENT DOCUMENTS

| | | |
|---|---|---|
| JP | 2013-175963 A | 9/2013 |
| WO | 2014/061487 A1 | 4/2014 |

OTHER PUBLICATIONS

Nakachi, et al., "A Study on Using MPEG Media Transport for Network Supported Collaborative Work", The Institute of Electronics, Information and Communication Engineers, IEICE Technical Report, Jul. 2013, pp. 15-20.

Shuichi Aoki, "Media Transport Technologies for Next Generation Broadcasting Systems", NHK Science and Technical Research Laboratories R&D Report, vol. 140, Jul. 15, 2013, pp. 22-31.

Nakachi, et al., "A Study on Using MPEG Media Transport for Network Supported Collaborative Work", IEICE Technical Report, vol. 113, No. 114, Jun. 27, 2013, pp. 15-20.

* cited by examiner

FIG. 3

| Syntax | No. of Bits | Format |
|---|---|---|
| TMCC ( ) { | | |
| for ( 0 ; N < 120 ; N++ ) { | | |
| RELATIVE STREAM NUMBER | 4 | uimslbf |
| } | | |
| for ( 0 ; M < 15 ; M++ ) { | | |
| TRANSMISSION STREAM ID | 16 | uimslbf |
| STREAM TYPE | 8 | bslbf |
| } | | |
| for ( 0 ; p < 120 ; p++ ) { | | |
| slot_p_top pointer | 16 | bslbf |
| slot_p_last pointer | 16 | bslbf |
| } | | |
| for ( 0 ; n < 15 ; n++ ) { | | |
| packet_length OF RELATIVE STREAM N | 16 | uimslbf |
| RELATIVE STREAM_SYNCHRONIZATION PATTERN BIT LENGTH | 8 | uimslbf |
| RELATIVE STREAM_SYNCHRONIZATION PATTERN | 32 | bslbf |
| } | | |
| } | | |

| STREAM TYPE OF RELATIVE STREAM 0 | STREAM TYPE OF RELATIVE STREAM 1 | STREAM TYPE OF RELATIVE STREAM 2 | ... | STREAM TYPE OF RELATIVE STREAM 15 |
|---|---|---|---|---|
| 8 | 8 | 8 | | 8 |

(b)

| VALUE | ASSIGNMENT |
|---|---|
| 00000000 | UNDEFINED |
| 00000001 | MPEG2-TS |
| 00000010 | TLV |
| 00000011 ~ 11111110 | UNDEFINED |
| 11111111 | NO ASSIGNMENT TYPE |

FIG. 6
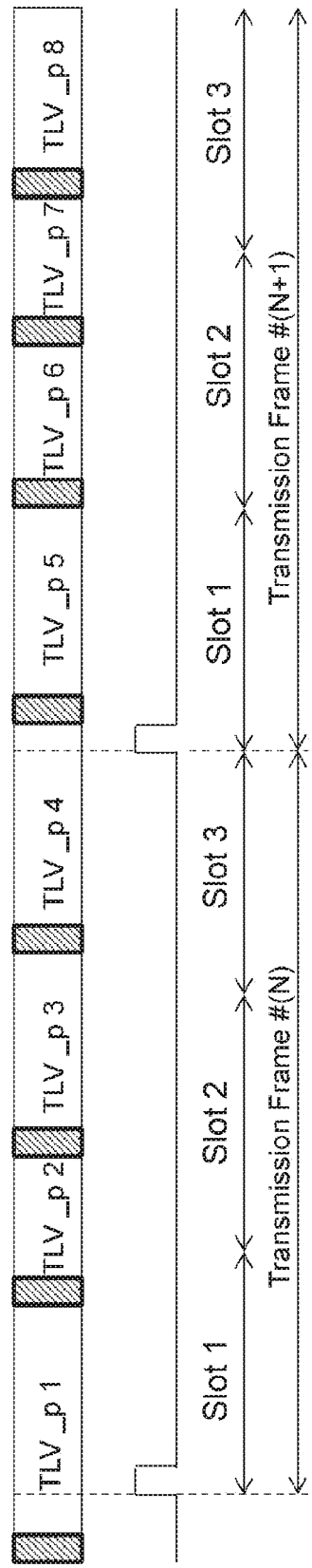
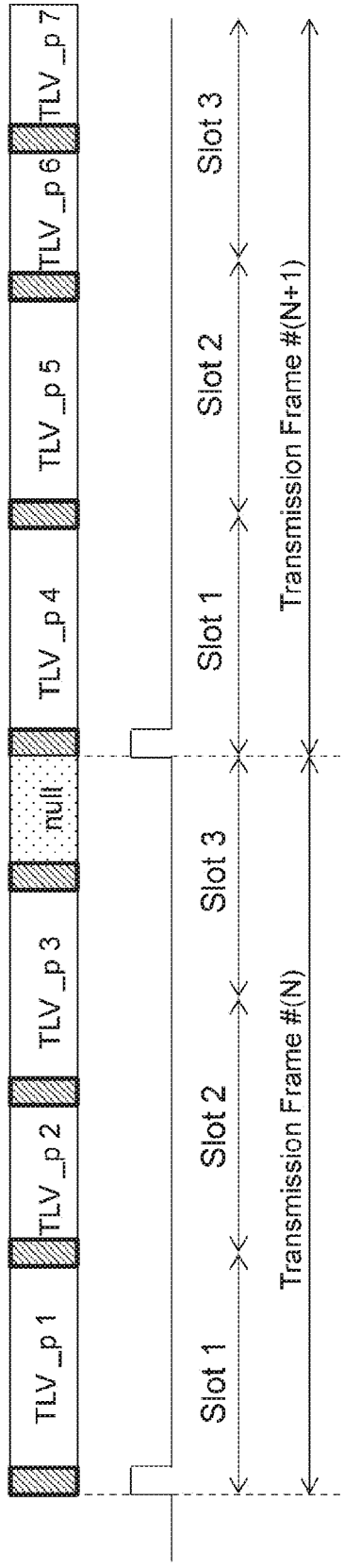

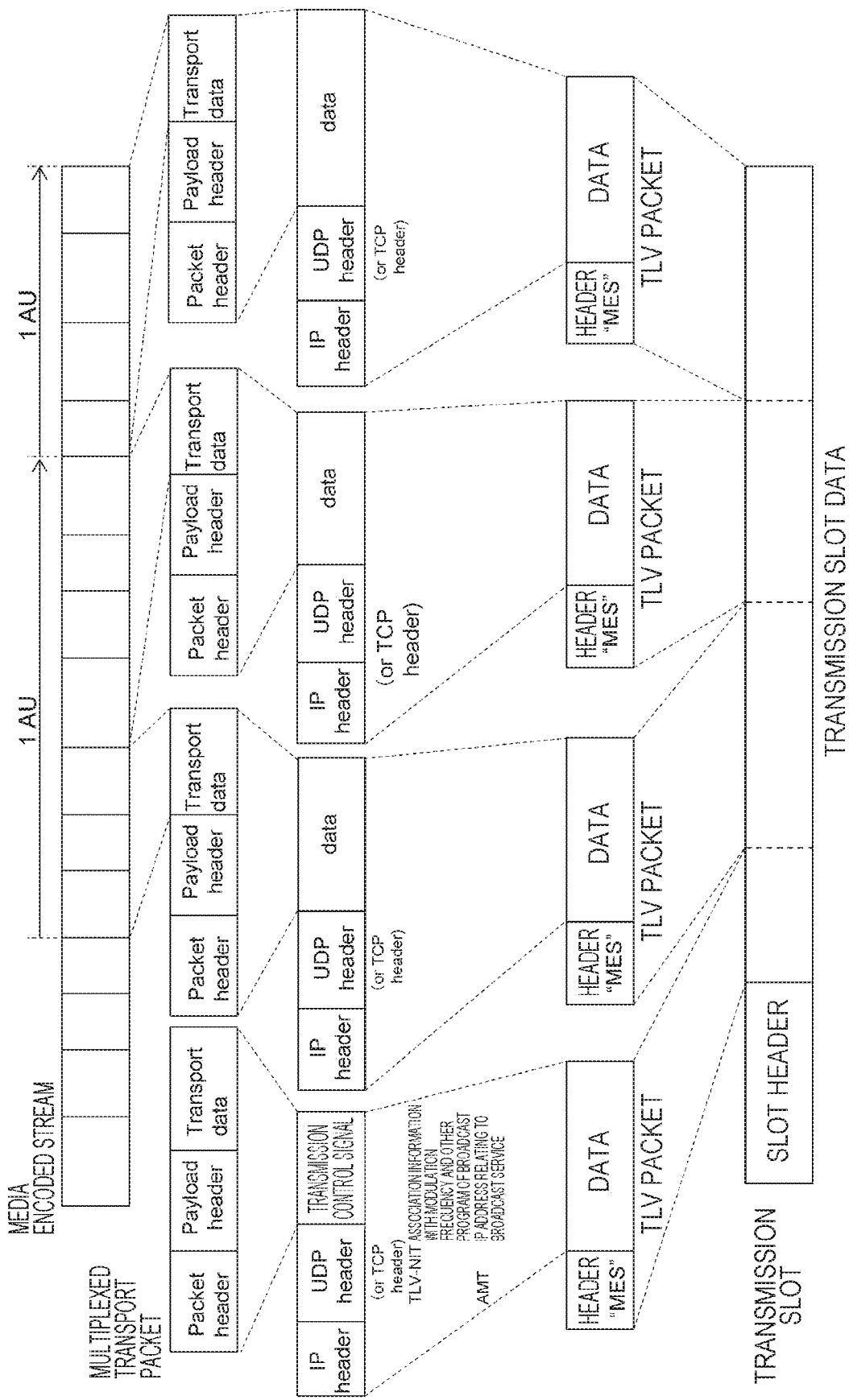

FIG. 8

| Syntax | No. of Bits | Format |
|---|---|---|
| TLV packet() { | | |
|     TLV_header | 32 | bslbf |
|     TLV_payload | | uimsbf |
| } | | |

FIG. 9

| syntax | no. of Bits | format |
|---|---|---|
| TLV_packet{ | | |
|     '01' | 2 | bslbf |
|     media_entry_start_bit | 1 | bslbf |
|     reserved_future_use | 5 | '11111' |
|     packet_type | 8 | bslbf |
|     length | 16 | uimsbf |
|     if (packet_type==0x01) | | uimslbf |
|         IPv4_packet ( ) | | |
|     else if (packet_type==0x02) | | |
|         IPv6_packet ( ) | | |
|     else if (packet_type==0x03) | | |
|         compressed_ip_packet( ) | | |
|     else if (packet_type==0xFE) | | |
|         signalling_packet ( ) | | |
|     else if (packet_type==0xFF){ | | |
|         for(i=0;i<N;i++){ | | |
|             NULL | 8 | bslbf |
|         } | | |
|     } | | |
| } | | |

FIG. 10

Semantics

| media_entry_start_bit (1bit) | : INDICATES WHETHER OR NOT PAYLOAD INCLUDES START BYTE OF MEDIA DATA. |

"0" START BYTE OF ACCESS UNIT OF MEDIA DATA IS INCLUDED.
"1" START BYTE OF ACCESS UNIT OF MEDIA DATA IS NOT INCLUDED.

packet type

| packet type value | assignment |
|---|---|
| 0x00 | Reserved |
| 0x01 | IPv4 packet |
| 0x02 | IPv6 packet |
| 0x03 | Header compressed IP packet |
| 0x04 – 0xFD | Reserved |
| 0xFE | Transmission Control Signal packet |
| 0xFF | Null packet (+) |

COMBINATION OF MAIN ELEMENTS

| media_entry_start_bit | packet_type | payload |
|---|---|---|
| 0 | "1", "2", "3" | IP packet |
| 1 | "0xFE" | entry_offset_position |
| 1 | "1", "2", "3" | IP packet |

(b)

FIG. 12 entry offset position signaling packet (a)

| Syntax | No. of Bits | Format |
|---|---|---|
| signalling_packet { | | |
| signaling_id | 8 | uimsbf |
| entry_offset_position | 16 | uimsbf |
| } | | |

Semantics (b)

signaling_id (8bits)
  INDICATES ID OF SIGNALING PACKET.
  FOR EXAMPLE, "0x10" MEANS THAT IT IS entry offset position signaling packet.
entry_offset_position (16bits)
  INDICATES OFFSET VALUE FROM HEAD OF TLV PACKET TO START BYTE OF ACCESS UNIT OF MEDIA DATA.

FIG. 14

Internet Protocol headers

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Version | | | | IHL | | | | TOS/DSCP/ECN | | | | | | | | Total Length | | | | | | | | | | | | | | | |
| Identification | | | | | | | | | | | | | | | | Flags | | | Fragment Offset | | | | | | | | | | | | |
| Time To Live | | | | | | | | Protocol | | | | | | | | Header Checksum | | | | | | | | | | | | | | | |
| Source Address | | | | | | | | | | | | | | | | | | | | | | | | | | | | | | | |
| Destination Address | | | | | | | | | | | | | | | | | | | | | | | | | | | | | | | |
| Options | | | | | | | | | | | | | | | | | | | | | | | | Padding | | | | | | | |

IHL (header length in 32bit count) = 5 IS FIXED.
Option IS NONE.

length (bytes) = header(FIXED-LENGTH) + payload

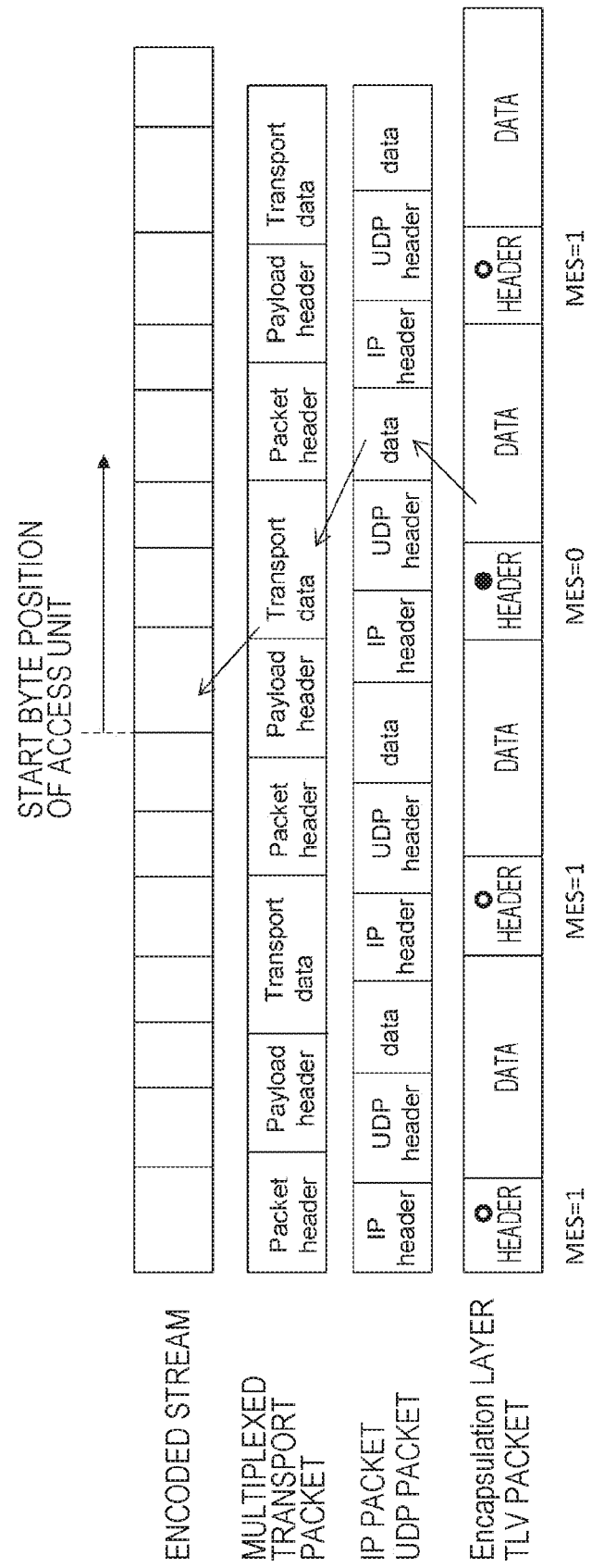

TRANSMISSION DEVICE TO TRANSMIT A TRANSMISSION STREAM IN WHICH A TRANSMISSION PACKET IS CONTIGUOUSLY ARRANGED

CROSS REFERENCE TO RELATED APPLICATIONS

This application is a U.S. National Phase of International Patent Application No. PCT/JP2015/063391 filed on May 8, 2015, which claims priority benefit of Japanese Patent Application No. JP 2014-098730 filed in the Japan Patent Office on May 12, 2014. Each of the above-referenced applications is hereby incorporated herein by reference in its entirety.

TECHNICAL FIELD

The present technology relates to a transmission device, a transmission method, a reception device, and a reception method, and specifically relates to a transmission device for transmitting a transmission stream in which a transmission packet is contiguously arranged.

BACKGROUND ART

In a case in which a service stream is provided on an IP packet, there may be a case in which a capsule layer is provided as an interface between a physical layer for performing modulation of a transmission line and an IP packet layer for packetizing data (see Patent Document 1, for example). Conventionally, as information contained by the capsule layer, data and file download, in which there is no restriction of time management, has been regarded to be adequate.

CITATION LIST

Patent Document

Patent Document 1: Japanese Patent Application Laid-Open No. 2012-015875

SUMMARY OF THE INVENTION

Problems to be Solved by the Invention

In a case in which a service is performed of sharing a service through the broadcast wave and an IP distribution service, it is considered that a realtime-based service is transmitted through the capsule layer, besides a conventional application, such as a file download, in which the packet of the service of the broadcast wave is loaded onto the IP packet and the IP packet is transmitted by the broadcast wave through the capsule layer.

A layer of the IP packet lies on the packet of the capsule layer; a layer of an internet packet such as UDP or TCP lies on the layer of the IP packet; a transport layer of the media lies on the layer of an internet packet; and a media encoded layer such as video, audio, or subtitles lies on the transport layer. The size of each of these layers depends on encoding in each of the layers, and is variable. In a case in which these variable-length layers stacked in multiple stages are decoded, delay of an entire system is generated.

The media data may or may not be encrypted for each of an access unit such as a picture. Signaling information being non-media data may not be encrypted. In addition, encoded data of image data is encrypted, and meta-information of when the image data is encoded may not be encrypted. In a case in which encryption is initialized for each access unit, it is necessary to perform decipherment from an initialization position of the encryption in order to quickly perform the decipherment of the encryption on the stream. When the initialization position is not known, decipherment cannot be started, and delay may be generated in playback of the media such as the video, audio, or the playback itself may be difficult.

It is an important function for the media playback side that a start position of the access unit of the media data or an initialization position of the encryption can be quickly detected from a lower layer without parsing across multiple stages of variable-length encoded layers.

An object of the present technology is to provide that detection of a start byte of an access unit of media data can be performed fast and easily from a layer of a transmission packet.

Solutions to Problems

A concept of the present technology is in a transmission device including: a transmission unit for transmitting a transmission stream in which a transmission packet is contiguously arranged having a multiplexed transport packet including media data in an upper layer; and an information insertion unit for inserting identification information for identifying whether or not a start byte of an access unit of the media data exists in the transmission packet, into a header of the transmission packet.

In the present technology, a transmission stream is transmitted in which a transmission packet is contiguously arranged having a multiplexed transport packet including media data in an upper layer, by the transmission unit. For example, the transmission packet may be made to be a packet of a capsule layer obtained by encapsulating an IP packet including a multiplexed transport packet in a payload. In this case, the transmission packet may be made to be a TLV packet or a GSE packet, for example. Identification information is inserted for identifying whether or not the start byte of the access unit of the media data exists in the transmission packet, into the header of the transmission packet, by the information insertion unit.

As described above, in the present technology, the identification information is inserted for identifying whether or not the start byte of the access unit of the media data exists in the transmission packet, and, in a reception side, detection of the start byte of the access unit of the media data can be performed fast and easily from a layer of a transmission packet.

Incidentally, in the present technology, transmission unit may be made to further transmit offset information indicating a position of the start byte of the access unit of the media data in the transmission packet, for example. In this case, the transmission unit may be made to insert a transmission packet having a signaling packet including the offset information into the transmission stream, for example. Thus, in the reception side, the position of the start byte of the access unit of the media data existing in the transmission packet can be easily grasped.

In addition, another concept of the present technology is in a reception device including a reception unit for receiving a transmission stream in which a transmission packet is contiguously arranged having a multiplexed transport packet including media information in an upper layer, wherein identification information is inserted for identifying whether or not a start byte of an access unit of media data exists in the transmission packet, into the header of the transmission packet, and the reception device further includes a processing unit for processing the received transmission stream by using the identification information.

In the present technology, the reception unit receives a transmission stream in which a transmission packet is contiguously arranged having a multiplexed transport packet including media information in an upper layer. Identification information is inserted for identifying whether or not the start byte of the access unit of the media data exists in the transmission packet, into the header of the transmission packet. The processing unit processes the received transmission stream by using the identification information.

For example, the transmission packet may be made to be a packet of a capsule layer obtained by encapsulating an IP packet including a multiplexed transport packet in a payload. In this case, the transmission packet may be made to be a TLV packet or a GSE packet, for example.

As described above, in the present technology, the transmission stream in which the transmission packet is contiguously arranged is received and processed. In this case, processing is performed by using the identification information for identifying whether or not the start byte exists of the access unit of the media data inserted into the transmission packet. For that reason, detection of the start byte of the access unit of the media data can be performed fast and easily from the layer of the transmission packet, and reduction of processing delay of the media data can be achieved.

Incidentally, in the present technology, the reception unit may be made to further receive the offset information indicating the position of the start byte of the access unit of the media data in the transmission packet, and the processing unit may be made to process the received transmission stream by using the offset information, for example. Thus, in the reception side, the position of the start byte of the access unit of the media data in the transmission packet can be easily grasped, and processing efficiency of the media data can be improved.

Effects of the Invention

According to the present technology, detection of the start byte of the access unit of the media data can be performed fast and easily from the layer of the transmission packet. Incidentally, the advantageous effects described in this specification are merely examples, and the advantageous effects of the present technology are not limited to them and may include additional effects.

BRIEF DESCRIPTION OF DRAWINGS

FIG. 3 is a diagram showing an example structure of TMCC information in a transmission frame.

FIGS. 4(a) and 4(b) are diagrams for describing main contents of the example structure of the TMCC information in the transmission frame.

FIGS. 6(a) and 6(b) are diagrams respectively showing examples in which arrangement of the TLV packet is not synchronized and is synchronized with the start of each transmission frame.

FIG. 7 is a schematic packet configuration diagram of the transmission protocol stack.

FIG. 8 is a diagram showing an example structure of the TLV packet (TLV packet( )).

FIG. 9 is a diagram showing a detailed example structure of the TLV packet.

FIG. 10 is a diagram showing contents of "media_entry_start_bit" of a TLV packet header.

FIGS. 11(a) and 11(b) are diagrams respectively describing a packet type indicated by "packet_type" of the TLV packet header, and a combination of main elements of the "media_entry_start_bit" and the "packet_type."

FIGS. 12(a) and 12(b) are diagrams showing an example structure of an entry offset position signaling packet, and main elements in the example structure.

FIG. 14 is a diagram showing an example structure of an IP header.

FIG. 19 is a diagram showing that when MES is 0 in the header of a TLV packet, a start byte of an access unit of media data is included in the payload of the TLV packet.

MODES FOR CARRYING OUT THE INVENTION

Figure 1:
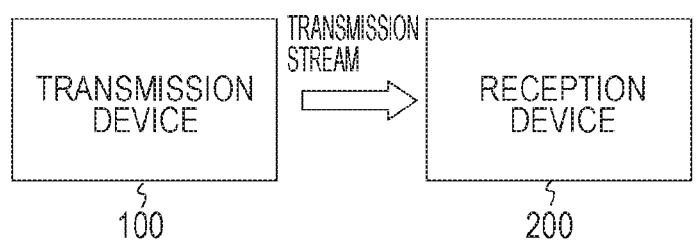
FIG. 1 is a block diagram showing an example configuration of a transmission/reception system as an embodiment.

The following is a description of a mode for carrying out the invention (the mode will be hereinafter referred to as the "embodiment"). Incidentally, explanation will be made in the following order.
1. Embodiment
2. Modifications 1. Embodiment Example Configuration of a Transmission/Reception System FIG. 1 shows an example configuration of a transmission/reception system 10 as an embodiment. The transmission/reception system 10 is configured to include a transmission device 100, and a reception device 200.

The transmission device 100 loads a transmission stream in which a type length value (TLV) packet as a transmission packet is contiguously arranged, onto the broadcast wave, and transmits the transmission stream to a reception side through an RF transmission line. The TLV packet is a packet of multi-layer configuration having a multiplexed transport packet, and media data such as video, audio in an upper layer, and is a packet of a capsule layer obtained by encapsulating an IP packet including the multiplexed transport packet and a transmission control signal (TLV-NIT, AMT) into a payload.

In the embodiment, identification information is inserted for identifying whether or not the transmission packet includes a start byte of an access unit of the media data, into the header of the transmission packet. In addition, in the embodiment, the transmission device 100 loads offset information indicating a position of the start byte of the access unit of the media data in the TLV packet, onto the broadcast wave, and transmits the offset information to the reception side through the RF transmission line. In this case, the transmission device 100 inserts a TLV packet having a signaling packet including the offset information, into the transmission stream.

The reception device 200 receives the transmission stream loaded onto the broadcast wave and transmitted from the transmission device 100. In the transmission stream, the TLV packet as the transmission packet is contiguously arranged, and identification information is inserted for identifying whether or not the TLV packet includes the start byte of the access unit of the media data, into the header of the TLV packet transmission packet. In addition, the reception device 200 receives from the transmission device 100 the offset information from the head of the TLV packet, the offset information indicating the position of the start byte of the access unit of the media data in the TLV packet. The reception device 200 processes the media data on the basis of the identification information and the offset information, and performs image display and audio output using the media data.

Figure 2:
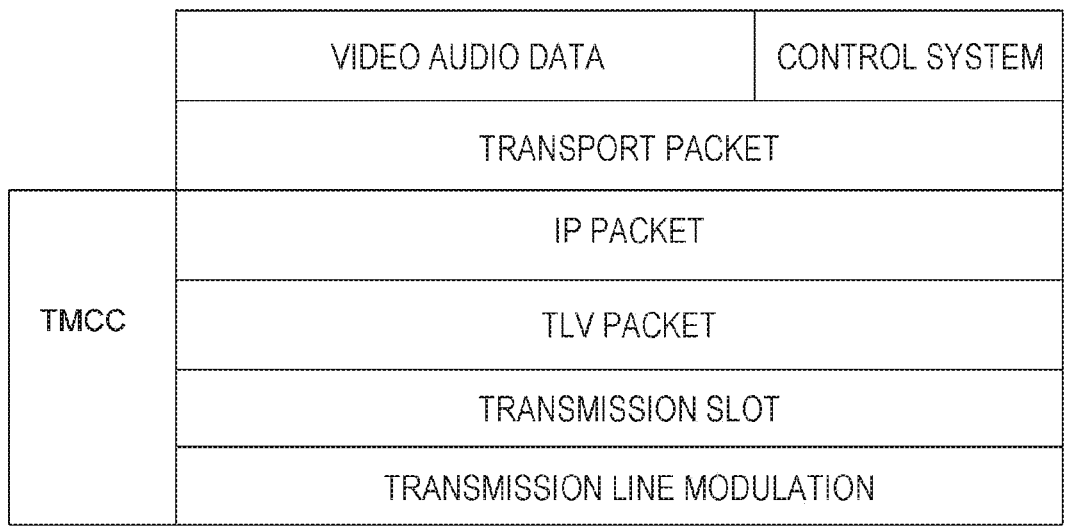
FIG. 2 is a diagram showing a transmission protocol stack.

FIG. 2 shows a transmission protocol stack. A transmission line modulation layer lies at the bottom. A transmission slot lies on the transmission line modulation layer, and the TLV packet lies in the transmission slot, and the IP packet lies on the TLV packet. Furthermore, a multiplexed transport packet including control system data and the media data of video, audio lies on the IP packet via a UDP packet or TCP packet not shown.

The transmission slot is included up to 120 pieces, depending on a modulation method, in one transmission frame. Transmission and multiplexing configuration control (TMCC) information is added to each transmission slot. The TMCC information is configured by information relating to transmission control such as assignment of the transmission stream to each transmission slot, and a relationship with a transmission method. As one of the TMCC information, pointer information is included indicating a position of the TLV packet in the transmission slot. By referring to the pointer information, parsing can be started correctly from the beginning of the TLV packet.

An area available for transmission of the TMCC information is 9422 bits per transmission frame. In a case in which switching of the transmission method or the like is performed, the TMCC information transmits information after the switching at timing two frames prior to actual switching timing. Incidentally, a minimum update interval of the TMCC information is, for example, one frame. FIG. 3 shows an example structure (Syntax) of the TMCC information in the transmission frame.

In an advanced broadband satellite digital broadcasting method, a stream of up to 16 can be transmitted by one satellite repeater. "Relative stream/slot information" assigns a relative stream number of any of 0 to 15 to each of the slots, and it is indicated that data of the slots having the same relative stream number are one stream.

In addition, "relative stream/transmission stream ID information" assigns a transmission stream ID to each of relative streams of relative stream numbers 0 to 15. Here, the transmission stream ID is "TS_ID" in a case in which the relative stream is MPEG2-TS, and is "TLV stream ID" in a case in which the relative stream is TLV, for example. In addition, "relative stream/stream type information" represents a type of the stream of each relative stream number as shown in FIG. 4(a). As shown in FIG. 4(b), for example, "0x01" indicates MPEG2-TS, and "0x02" indicates TLV.

Figure 5:
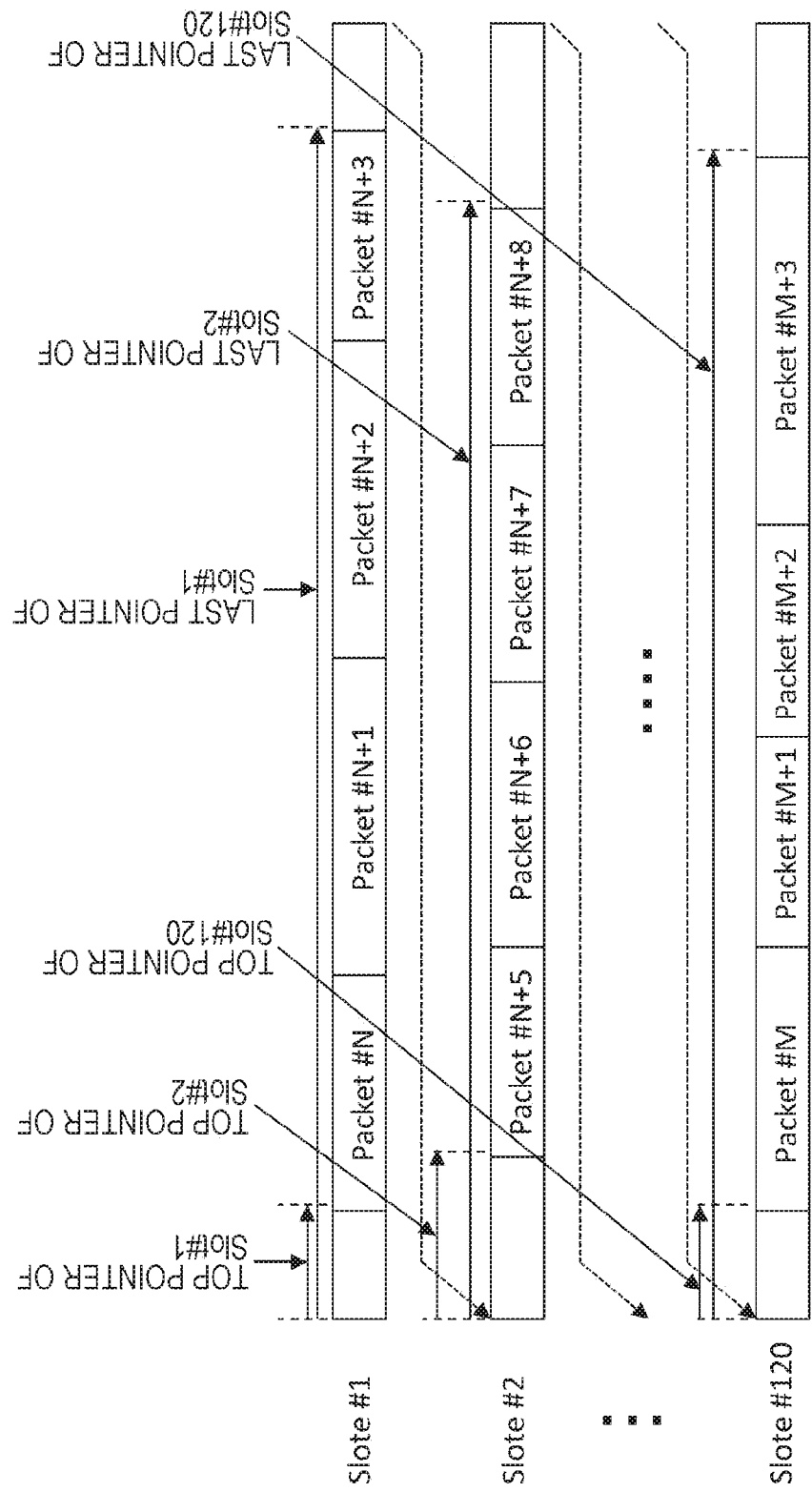
FIG. 5 is a diagram showing an example in which a TLV packet is stored in a data area of each slot of the transmission frame.

"Pointer/slot information" is configured by a top pointer and a last pointer to each slot, and is mainly used for packet synchronization and packet invalidation. FIG. 5 shows an example in which the TLV packet is stored in a data area of each slot. The top pointer indicates the first packet head byte position of the packet stored in each slot. The last pointer indicates the last packet end byte position +1 of the packet stored in each slot.

Incidentally, when the top pointer is "0xFFFF," it is indicated that the first TLV packet head byte in the slot is absent. This means that the first TLV packet in the slot leads from a previous slot. In addition, when the last pointer is "0xFFFF," it is indicated that the last TLV packet final byte in the slot is absent. This means that the last TLV packet in the slot leads to a next slot.

FIG. 6(a) shows an example in which arrangement of the TLV packet is not synchronized with the start of each transmission frame. The start of each slot is uniquely determined by the transmission frame. The TLV packet exists independently of the slot. In a case in which the TLV packet leads across plural transmission frames, the TLV packet exists divided into two transmission frames.

FIG. 6(b) shows an example in which arrangement of the TLV packet is synchronized with the start of each transmission frame. The start of each slot is uniquely determined by the transmission frame. The TLV packet does not necessarily synchronize with the slot; however, the start of the transmission frame is the start of the TLV packet. That is, the start of the first slot (Slot 1) of each transmission frame is the start of the TLV packet.

In a case of FIG. 6(b), an invalid (null) area is often generated at the end of the transmission frame, and transmission efficiency is decreased in comparison with a case of FIG. 6(a). Incidentally, for simplification of the drawing, the example is shown in which three slots exist in each transmission frame. In fact, the slot is included up to 120 pieces depending on the modulation method, as described above.

FIG. 7 shows a schematic packet configuration diagram of the transmission protocol stack. The transmission slot includes a slot header, and transmission slot data. The transmission slot data includes the TLV packet. The TLV packet includes a header and data. In the embodiment, MES (Media_entry_start_bit) is inserted as identification information for identifying whether or not the TLV packet includes the start byte of the access unit of the media data, into the header of the TLV packet.

In addition, as the data of the TLV packet, the IP packet or the transmission control signal is included. The transmission control signal is the "TLV-NIT" or the "AMT." The "TLV-NIT" is association information with a modulation frequency and another program of the broadcast. The "AMT" is an IP address relating to a broadcast service.

The IP packet includes an IP header, and the UDP packet or TCP packet as data. Here, the UDP packet includes a UDP header and data, and the TCP packet includes a TCP header and data. As the data of the UDP packet or TCP packet, the multiplexed transport packet is included. The multiplexed transport packet includes a packet header, a payload header, and transport data.

As the transport data of the multiplexed transport packet, an entire or a part of the access unit (AU: Access Unit) is included configuring an encoded stream of transmission media such as video, audio. In a case of video, one access unit means data of one picture. In a case of audio, one access unit means an access unit of audio in which a predetermined number, for example, 1024 samples, of data is collected. The multiplexed transport packet is, for example, an MPEG media transport (MMT) packet, or a real-time transport protocol (RTP) packet, or a packet of ISO base media file format (ISOBMFF) referred to as MP4.

FIG. 8 shows an example structure (Syntax) of the TLV packet (TLVpacket). The TLVpacket includes a 32-bit TLV-header (TLV_header), and a variable-length TLV payload (TLV_payload).

FIG. 9 shows a detailed example structure (Syntax) of the TLV packet (TLV packet( )). The 32-bit TLV_header (TLV_header) is configured by a 2-bit field of "01," a 1-bit field of "media_entry_start_bit," a 5-bit field of "reserved future use," an 8-bit field of "packet_type," and a 16-bit field of "length."

As shown in FIG. 10, the 1-bit field of the "media_entry_start_bit" indicates whether or not the payload includes the start byte of the access unit of the media data. "0" indicates that the start byte of the access unit of the media data is included. "1" indicates that the start byte of the access unit of the media data is not included.

The 8-bit field of the "packet_type" indicates a packet_type of the TLV packet (see FIG. 11(a)). "0x01" indicates that an IPv4 packet is included. "0x02" indicates that an IPv6 packet is included. "0x03" indicates that a header compressed IP packet is included. 0xFE" indicates that the transmission control signal (Transmission Control Signal) is included. "0xFF" indicates that the TLV packet is a Null packet. The 16-bit field of the "length" indicates the size of the variable-length TLV_payload (TLV_payload) following the TLV header (TLV_header).

FIG. 11(b) shows a combination of main elements of the "media_entry_start_bit" and the "packet_type." In a case in which the "media_entry_start_bit" is "0" and the "packet_type" is "1," "2," or "3," it is meant that the payload of the TLV packet includes the IP packet, and the IP packet includes the start byte of the access unit of the media data.

In addition, in a case in which the "media_entry_start_bit" is "1" and the "packet_type" is "1," "2," or "3," it is meant that the payload of the TLV packet includes the IP packet, and the IP packet does not include the start byte of the access unit of the media data. In addition, in a case in which the "media_entry_start_bit" is "1" and the "packet_type" is "0xFE," it is meant that the payload of the TLV packet includes an entry offset position signaling packet (entry_offset_position signaling packet).

The transmission device 100 inserts the TLV packet including the entry_offset_position signaling packet into the transmission stream in order to indicate the position of the start byte of the access unit of the media data in the TLV packet (MES=0). Incidentally, the TLV packet including the entry_offset_position signaling packet is arranged before the TLV packet in which MES is 0.

FIG. 12(a) shows an example structure of an entry_offset_position signaling packet. FIG. 12(b) shows main contents in the example structure. An 8-bit field of "signaling id" indicates an ID of the signaling packet. For example, "0x10" indicates that the signaling packet is the entry_offset_position signaling packet. A 16-bit field of "entry_offset_position" indicates an offset value FO from the head of the TLV packet to the start byte of the access unit of the media data.

Figure 13:
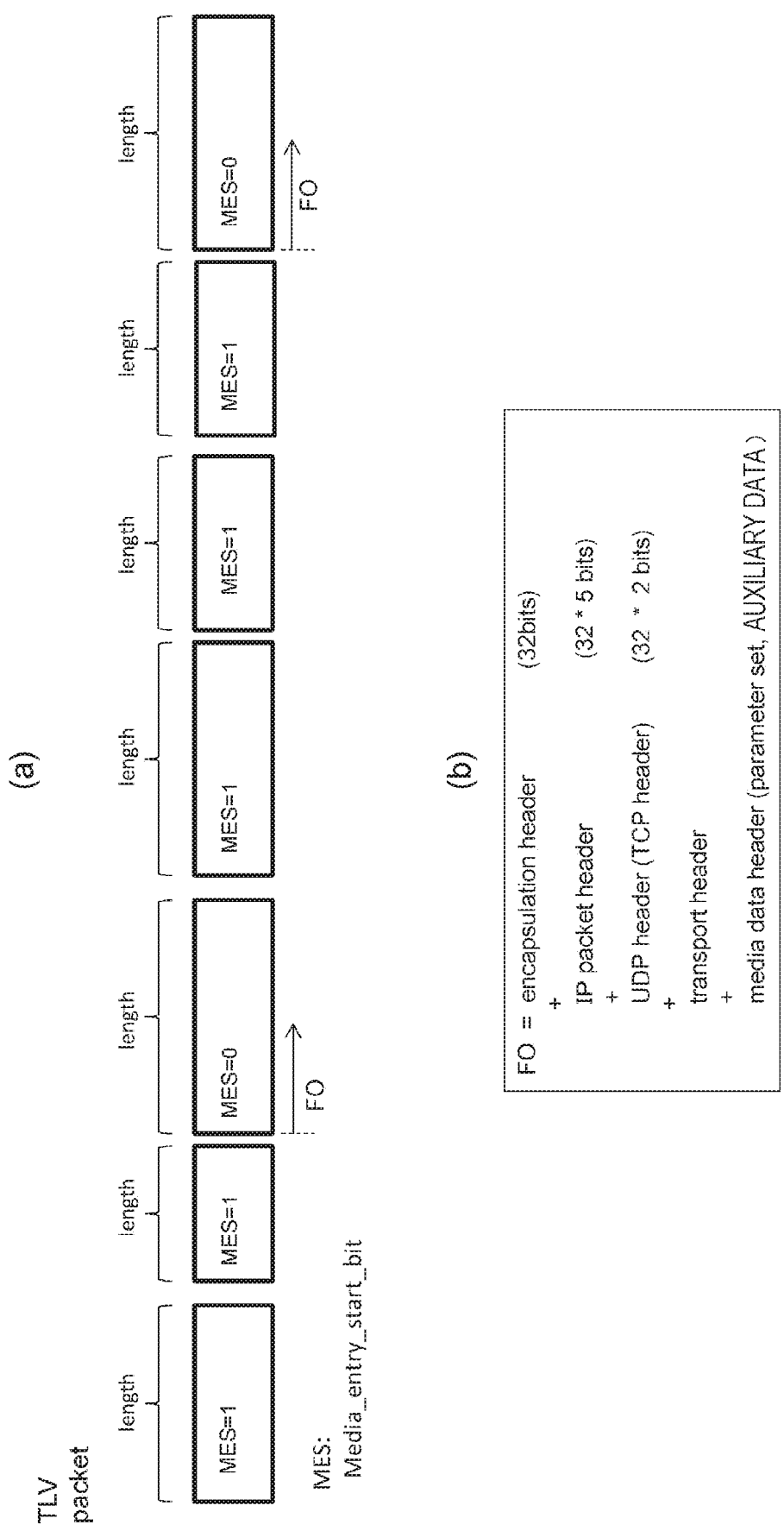
FIGS. 13(a) and 13(b) are diagrams showing an example of a transmission stream in which the TLV packet is contiguously arranged.

FIG. 13(a) shows an example of a transmission stream in which the TLV packet is contiguously arranged. In a case of a TLV packet in which the payload includes the start byte of the access unit of the media data, MES (media_entry_start_bit) of the header is made to be "0." In addition, in the case of the TLV packet, the start byte exists at a position offset by the offset value FO from the head of the TLV packet.

Here, the offset value FO is obtained as a sum value of each header size, as shown in FIG. 13(b). That is, the FO is a sum of the header size of the TLV packet being the packet of the capsule layer (32 bits), the header size of the IP packet (32*5 bits), the size of the UDP header (32*2 bits), the header size of the transport packet, and the size of the header (parameter set, auxiliary data) of the media data.

Figure 15:
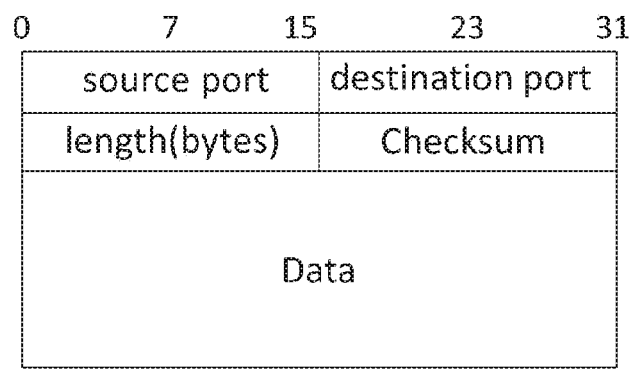
FIG. 15 is a diagram showing an example structure of a UDP header and a payload.

FIG. 14 shows an example structure (Syntax) of the internet protocol (IP) header. A 4-bit field of "IHL=Hdr Len" represents the length of the IP header itself in a unit of 32 bits. In the embodiment, Option is none, and the length is fixed to "IHL=5." FIG. 15 shows an example structure (Syntax) of the UDP header and the payload. The 16-bit field of the "length" indicates the sum value of the size of the 8-byte fixed-length header and the payload.

Figure 16:
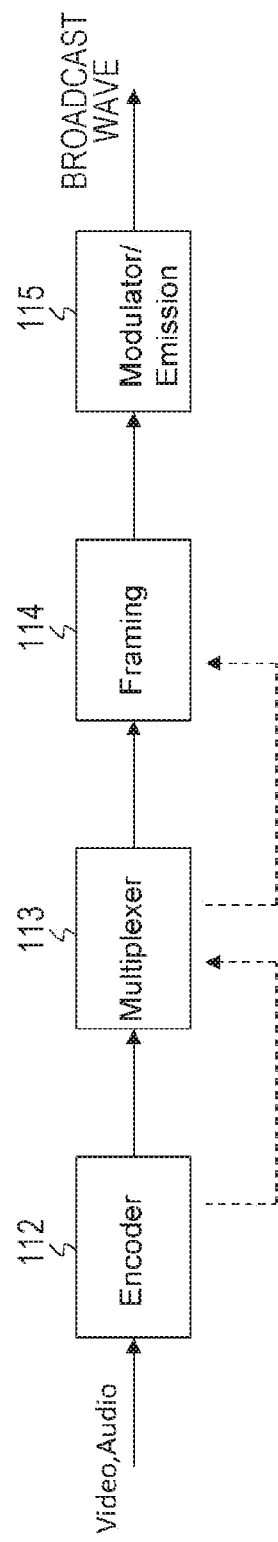
FIG. 16 is a block diagram showing an example configuration of a transmission device.

FIG. 16 shows an example configuration of the transmission device 100. The transmission device 100 includes an encoder unit 112, a multiplexer unit 113, a framing unit 114, and a modulator/emission unit 115. The encoder unit 112 performs encoding to the media data such as video, audio, and obtains encoded data. For example, to the video data, encoding is performed, such as MPEG4-AVC, or high efficiency video coding (HEVC), as a typical example.

In addition, the encoder unit 112 packetizes the encoded data of video, audio, and the like, and generates the multiplexed transport packet for each of the media. The multiplexed transport packet is, for example, the MMT packet, or the RTP packet, or the packet of ISO base media file format (ISOBMFF) referred to as MP4. In addition, the encoder unit 112 packetizes the multiplexed transport packet into UDP or TCP, and further adds the IP header, and generates the IP packet including the multiplexed transport packet. The encoder unit 112 transmits each IP packet to the multiplexer unit 113. The multiplexer unit 113 multiplexes each IP packet.

In addition, the multiplexer unit 113 determines whether or not the start byte of the access unit of the media data is included, on the basis of the IP packet including the encoded data of video, audio, and the like. The multiplexer unit 113 also receives provision of the information on whether or not the start byte of the access unit of the media data is included, as shown by the dashed line, simultaneously, when provision of the IP packet is received from the encoder unit 112.

In addition, the multiplexer unit 113 provides the multiplexed stream of the IP packet to the framing unit 114. At this time, the multiplexer unit 113 also provides to the framing unit 114 the information on whether or not the start byte of the access unit of the media data is included in correspondence with the provision of the IP packet, as shown by the dashed line.

The framing unit 114 generates the TLV packet in which the multiplexed IP packet is encapsulated. The framing unit 114 further generates the TLV packet in which the transmission control signal (TLV-NIT, AMT) is encapsulated. The framing unit 114, when performing encapsulation, performs setting of the identification information included in the TLV header for identifying whether or not the start byte of the access unit of the media data is included, that is, the 1-bit field of the "media_entry_start_bit" (see FIG. 9).

In addition, the framing unit 114 also generates the TLV packet including the entry offset position signaling packet, in the payload. The entry offset position signaling packet has the offset value FO from the head of the TLV packet to the start byte of the access unit of the media data, as described above.

The framing unit 114 further performs framing processing for storing each TLV packet in the slot of the transmission frame. The framing unit 114 provides the generated transmission frame to the modulator/emission unit 115. The modulator/emission unit 115 performs RF modulation processing to the transmission frame to make the broadcast wave, and transmits the transmission frame to the reception side through the RF transmission line.

Figure 17:
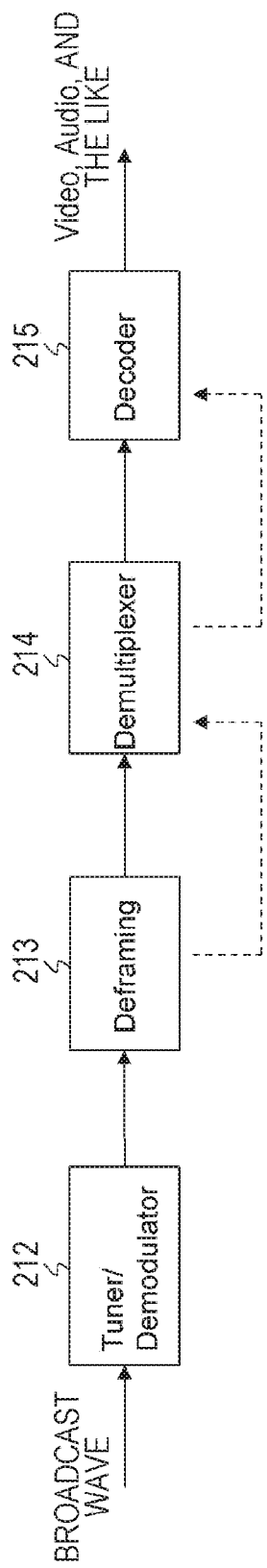
FIG. 17 is a block diagram showing an example configuration of a reception device.

FIG. 17 shows an example configuration of the reception device 200. The reception device 200 includes a tuner/demodulator unit 212, a deframing unit 213, a demultiplexer unit 214, and a decoder unit 215. The tuner/demodulator unit 212 receives the broadcast wave through the RF transmission line, and further performs RF demodulation processing to obtain the transmission frame including the TLV packet in the transmission slot. The tuner/demodulator unit 212 provides the transmission frame to the deframing unit 213.

The deframing unit 213 extracts the TLV packet included in each slot from the transmission frame. The deframing unit 213 further performs decapsulation processing to each TLV packet extracted, and obtains the IP packet, the transmission control signal (TLV-NIT, AMT), and the like. Here, the transmission control signal also includes the entry offset position signaling packet having the offset value FO from the head of the TLV packet to the start byte of the access unit of the media data.

The deframing unit 213 provides the obtained transmission control signal to a control unit not shown. In addition, the deframing unit 213 provides the obtained IP packet to the demultiplexer unit 214. At this time, the deframing unit 213 also provides to the demultiplexer unit 214 the identification information included in the TLV header for identifying whether or not the start byte of the access unit of the media data is included, as shown by the dashed line, in correspondence with provision of each IP packet.

The demultiplexer unit 214 performs extraction processing for each type of the data included in the payload, to the IP packet from the deframing unit 213. The demultiplexer unit 214 provides the extracted IP packet of each type to the corresponding decoder unit 215. At this time, the demultiplexer unit 214 also provides to the decoder unit 215 the identification information for identifying whether or not the start byte of the access unit of the media data is included, as shown by the dashed line, in correspondence with the provision of each IP packet.

The decoder unit 215 performs depacketizing processing to the IP packet for each type, and further, if needed, performs decryption processing to the encryption data, and further performs decoding processing to the encoded data. The decoder unit 215 starts processing of encryption decrypting, decoding processing of the encoded data, and the like from the TLV packet including the start byte of the access unit, on the basis of the identification information and the offset information, under the control of the control unit, at the time of switching the broadcast channel, for example. The decoder unit 215 provides the video data to a display unit not shown, and provides the audio data to an audio output unit not shown.

Figure 18:
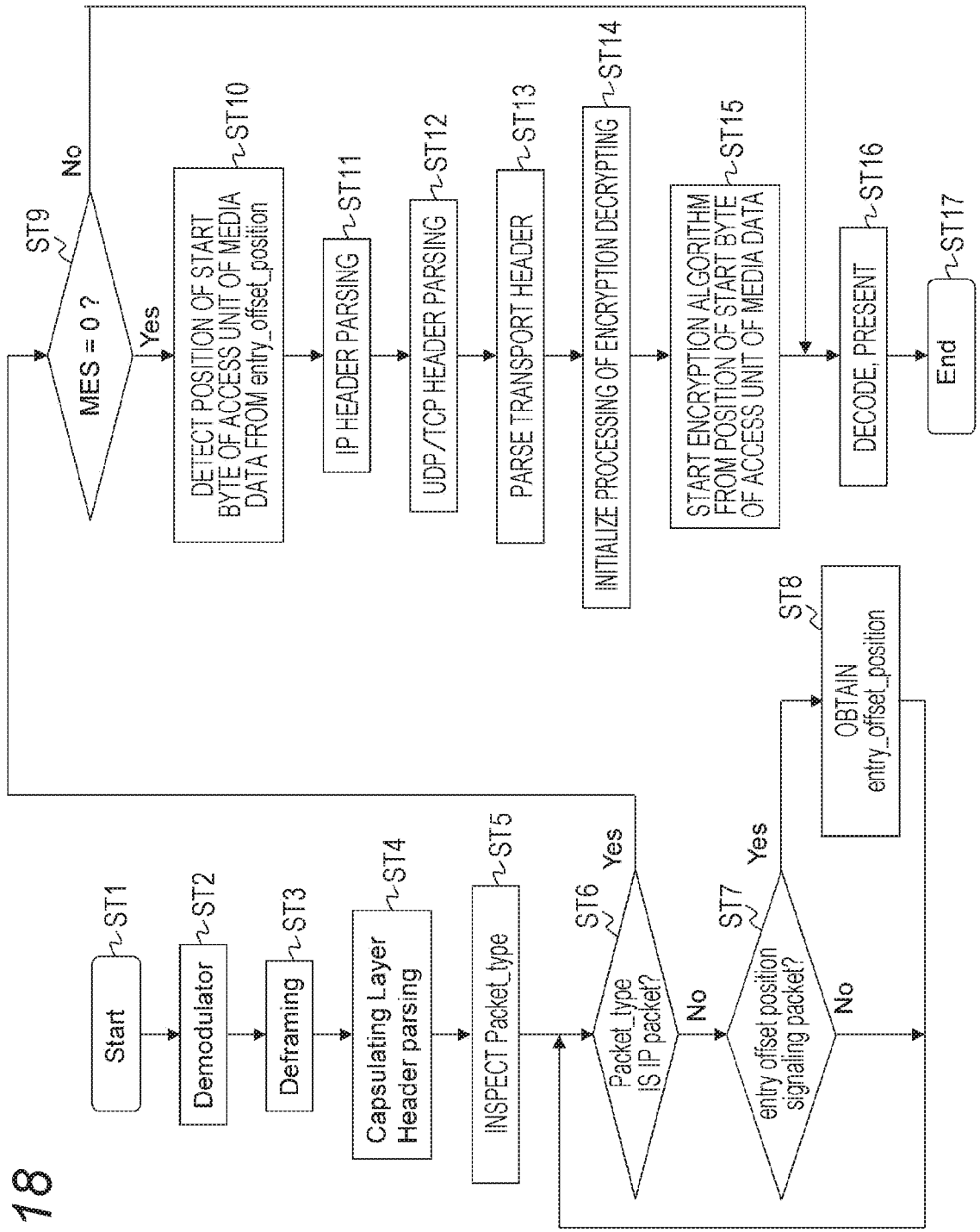
FIG. 18 is a flowchart schematically showing processing of each TLV packet in the reception device.

Flowchart of FIG. 18 schematically shows processing of each TLV packet in the reception device 200. The reception device 200 starts the processing, in step ST1. After that, the reception device 200 performs demodulation processing, in step ST2, and performs deframing to extract the TLV packet from the transmission frame, in step ST3.

Next, the reception device 200 parses the header of the TLVpacket, in step ST4. Then, the reception device 200 inspects a packet type (Packet_type), in step ST5. Next, the reception device 200 determines whether or not the packet type is the IP packet, that is, whether or not the payload includes the IP packet, in step ST6.

When the packet type is not the IP packet, the reception device 200 determines whether or not the payload includes the entry offset position signaling packet, in step ST7. When the entry offset position signaling packet is not included, the reception device 200 returns to the processing in step ST6. Meanwhile, when the entry offset position signaling packet is included, the reception device 200 obtains the "entry_offset_position," in step ST8.

When the packet type is the IP packet in step ST6, the reception device 200 determines whether or not MES (media_entry_start_bit) is 0, in step ST9. When MES is 0, the reception device 200 detects the position of the start byte of the access unit of the media data from the "entry_offset_position," in step ST10. As described above, the "entry_offset_position" indicates the offset value FO from the head of the TLV packet to the start byte of the access unit of the media data.

Next, the reception device 200 parses the IP header, in step ST11. Next, the reception device 200 parses the UDP or TCP header, in step ST12. Next, the reception device 200 parses the transport header, in step ST13. Then, the reception device 200 initializes the processing of encryption decrypting, in step ST14. Next, the reception device 200 starts an encryption algorithm from the position of the start byte of the access unit of the media data, in step ST15.

The reception device 200, after the processing in step ST15, moves to the processing in step ST16. Incidentally, when MES is 1 in step ST9, the reception device 200 immediately moves to the processing in step ST16. In step ST16, the reception device 200 decodes the encoded data of the media data after being subjected to the processing of encryption decrypting, and presents the data decoded. Here, the presentation means image display in a case in which the media data is the video data, and means audio output in a case in which the media data is the audio data, for example. The reception device 200, after the processing in step ST16, ends the processing, in step ST17.

Solid arrows of FIG. 19 show that, when MES is 0 in the header of a TLV packet, the start byte of the access unit of the media data is included in the payload of the TLV packet. In this case, it is not necessary to perform hierarchical packet parsing in order to determine whether or not the start byte of the access unit of the media data is included, and it is only necessary to parse the header of the TLV packet of the lowermost layer. Therefore, for example, in the broadcast channel switching, the delay can be suppressed of until when the start byte of the access unit of the media data is detected and decoding and presentation is performed.

As described above, in the transmission/reception system 10 shown in FIG. 1, MES (media_entry_start_bit) is inserted as the identification information for identifying whether or not the start byte of the access unit of the media data exists in the header of the TLV packet, in the transmission side. For that reason, in the reception side, it is not necessary to perform hierarchical packet parsing in order to determine whether or not the start byte of the access unit of the media data is included, and it is only necessary to parse the header of the TLVpacket of the lowermost layer. Therefore, for example, in the broadcast channel switching, the delay can be suppressed to be small of until when the start byte of the access unit of the media data is detected and decoding and presentation is performed.

In addition, in the transmission/reception system 10 shown in FIG. 1, the TLV packet including the entry offset position signaling packet is inserted into the transmission stream, in the transmission side. The entry offset position signaling packet includes the offset value from the head position of the TLV packet to the start byte of the access unit of the media data. For that reason, in the reception side, in the TLV packet in which MES is 0, that is, including the start byte of the access unit of the media data, the position of the start byte can be easily grasped.

2. Modifications

Incidentally, in the above embodiment, it has been described that the field of the "entry_offset_position" of the entry offset position signaling packet indicates the offset value FO from the head of the TLV packet to the start byte of the access unit of the media data. However, the field of the "entry_offset_position" may be made to indicate an offset value from the head position of the payload of the TLV packet to the start byte of the access unit of the media data.

In addition, in the above embodiment, an example has been shown in which the offset value FO is transmitted by inserting the TLV packet including the entry offset position signaling packet into the transmission stream. However, a method for transmitting the offset value FO is not limited to the method of the example. For example, it is also considered that the offset value FO is inserted into the payload or the header of the TLV packet of MES=0 to be transmitted.

In addition, although it has not been described above, the start position of the header of the media data may be made to be operated as a fixed value, by performing transmission so that the total is fixed of the header size of the capsule layer packet, the header size of the IP packet, the size of the UDP header (TCP header), and the header size of the transport packet.

In addition, in the above embodiment, an example has been shown in which the TLV packet is used as the packet of the capsule layer in the broadcast. However, the packet of the capsule layer is not limited to the TLV packet, and, for example, may be a generic stream encapsulation (GSE) packet, or another packet that serves similar role as the TLV packet or the GSE packet.

In addition, the present technology may also be embodied in the configurations described below.

(1) A transmission device including:
a transmission unit for transmitting a transmission stream in which a transmission packet is contiguously arranged having a multiplexed transport packet including media data in an upper layer; and
an information insertion unit for inserting identification information for identifying whether or not the transmission packet includes a start byte of an access unit of the media data, into the header of the transmission packet.

(2) The transmission device according to the (1), wherein
the transmission unit further transmits offset information indicating a position of the start byte in the transmission packet.

(3) The transmission device according to the (2), wherein
the transmission unit inserts a transmission packet having a signaling packet including the offset information into the transmission stream.

(4) The transmission device according to any one of the (1) to (3), wherein
the transmission packet is a packet of a capsule layer obtained by encapsulating an IP packet including the multiplexed transport packet in a payload.

(5) The transmission device according to the (4), wherein
the transmission packet is a TLV packet or a GSE packet.

(6) A transmission method including:
a transmission step for transmitting a transmission stream in which a transmission packet is contiguously arranged having a multiplexed transport packet including media data in an upper layer, by a transmission unit; and
an information insertion step for inserting identification information for identifying whether or not the transmission packet includes a start byte of an access unit of the media data, into the header of the transmission packet.

(7) A reception device including
a reception unit for receiving a transmission stream in which a transmission packet is contiguously arranged having a multiplexed transport packet including media information in an upper layer, wherein
identification information is inserted for identifying whether or not the transmission packet includes a start byte of an access unit of the media data, into the header of the transmission packet, and
the reception device further includes a processing unit for processing the received transmission stream by using the identification information.

(8) The reception device according to the (7), wherein
the transmission packet is a packet of a capsule layer obtained by encapsulating an IP packet including the multiplexed transport packet in a payload.

(9) The reception device according to the (8), wherein
the transmission packet is a TLV packet or a GSE packet.

(10) The reception device according to any one of the (7) to (9), wherein
the reception unit further receives offset information indicating a position of the start byte in the transmission packet, and
the processing unit processes the received transmission stream by using the offset information.

(11) A reception method including
a reception step for receiving a transmission stream in which a transmission packet is contiguously arranged having a multiplexed transport packet including media information in an upper layer, by a reception unit, wherein
identification information is inserted for identifying whether or not the transmission packet includes a start byte of an access unit of the media data, into the header of the transmission packet, and
the reception method further includes a processing step for processing the received transmission stream by using the identification information.

The main feature of the present technology is that the identification information (MES) is inserted for identifying whether or not the start byte of the access unit of the media data exists into the header of the TLV packet, thereby enabling to determine whether or not the start byte of the access unit of the media data is included, by only parsing the header of the TLV packet, in the reception side (see FIG. 7, FIG. 9).

REFERENCE SIGNS LIST

10 Transmission/reception system
100 Transmission device
112 Encoder unit
113 Multiplexer unit
114 Framing unit
115 Modulator/Emission unit
200 Reception device
212 Tuner/Demodulator unit 213 Deframing unit
214 Demultiplexer unit
215 Decoder unit

The invention claimed is:

1. A transmission device, comprising:
a transmitter configured to transmit a transmission packet in a transmission stream, the transmission packet including an IP packet in a payload of the transmission packet, the IP packet including a multiplexed transport packet including media data; and
a processor configured to insert identification information in a header of the transmission packet, the identification information indicating a presence of a start byte of an access unit of the media data, access units being at least an amount of data equivalent to one picture of video data, and configured to insert offset information in the header of the transmission packet indicating a position of the start byte in the transmission packet relative to the header of the transmission packet, the offset information being a sum of a header length of the transmission packet, a header length of the IP packet, and a header length of the transport packet;
wherein encryption and decryption of the media data is based on identification of the start byte of the access unit of the media data using the identification information.

2. The transmission device according to claim 1, wherein the transmitter is further configured to:
insert the transmission packet into the transmission stream such that the transmission packet includes a signaling packet,
wherein the signaling packet includes the offset information.

3. The transmission device according to claim 1,
wherein the transmission packet corresponds to a capsule layer, and
wherein the IP packet is encapsulated in the payload of the transmission packet.

4. The transmission device according to claim 3, wherein the transmission packet is one of a type length value (TLV) packet or a generic stream encapsulation (GSE) packet.

5. A transmission method, comprising:
transmitting, with a transmitter, a transmission packet in a transmission stream, the transmission packet including an IP packet in a payload of the transmission packet, the IP packet including a multiplexed transport packet, the multiplexed transport packet including media data; and
inserting, with a processor, identification information in a header of the transmission packet, the identification information indicating a presence of a start byte of an access unit of the media data, the access unit being at least an amount of data corresponding to one picture of video data, and inserting offset information in the header of the transmission packet indicating a position of the start byte in the transmission packet relative to the header of the transmission packet, the offset information being a sum of a header length of the transmission packet, a header length of the IP packet, and a header length of the transport packet,
wherein encryption and decryption of the media data is based on identification of the start byte of the access unit of the media data using the identification information.

6. A reception device, comprising:
a receiver configured to receive a transmission packet in a transmission stream, the transmission packet including an IP packet in a payload of the transmission packet, the IP packet including a multiplexed transport packet, the multiplexed transport packet including media data, identification information in a header of the transmission packet indicating a presence of a start byte of an access unit of the media data, the access unit being at least an amount of data corresponding to one picture of video data, and to receive offset information in the header of the transmission packet indicating a position of the start byte in the transmission packet relative to the header of the transmission packet, the offset information being a sum of a header length of the transmission packet, a header length of the IP packet, and a header length of the transport packet; and
a processor configured to process the transmission stream based on the identification information,
wherein the processor performs decryption of the media data based on identification of the start byte of the access unit of the media data using the identification information.

7. The reception device according to claim 6,
wherein the transmission packet corresponds to a capsule layer, and
wherein the IP packet is encapsulated in the payload of the transmission packet.

8. The reception device according to claim 7, wherein the transmission packet is one of a type length value (TLV) packet or a generic stream encapsulation (GSE) packet.

9. The reception device according to claim 6,
wherein the processing unit is further configured to process the transmission stream based on the offset information.

10. A reception method, comprising:
receiving, with a receiver, a transmission packet in a transmission stream, the transmission packet including an IP packet in a payload of the transmission packet, the IP packet including a multiplexed transport packet, the multiplexed transport packet including media data, identification information in a header of the transmission packet indicating a presence of a start byte of an access unit of the media data, access units being at least an amount of data equivalent to one picture of video data, and receiving offset information in the header of the transmission packet indicating a position of the start byte in the transmission packet relative to the header of the transmission packet, the offset information being a sum of a header length of the transmission packet, a header length of the IP packet, and a header length of the transport packet; and
processing, with a processor, the transmission stream based on the identification information,
wherein the processor performs decryption of the media data based on identification of the start byte of the access unit of the media data using the identification information.

11. The transmission device according to claim 1, wherein the identification information is one bit in length.

* * * * *